United States Patent [19]
Leone et al.

[11] Patent Number: 5,150,428
[45] Date of Patent: Sep. 22, 1992

[54] METHOD FOR GENERATING HALFTONE IMAGE DATA WITH RANDOMLY SELECTED THRESHOLD ARRAY

[75] Inventors: Anthony J. Leone, Pittsford; Kevin E. Spaulding, Spencerport, both of N.Y.

[73] Assignee: Eastman Kodak Company, Rochester, N.Y.

[21] Appl. No.: 677,933

[22] Filed: Apr. 1, 1991

[51] Int. Cl.[5] .............................................. G06K 9/38
[52] U.S. Cl. .................................. 382/50; 358/455; 358/465; 358/466
[58] Field of Search ................... 382/50; 358/455, 456, 358/457, 465, 466

[56] References Cited

U.S. PATENT DOCUMENTS

| | | | |
|---|---|---|---|
| 4,449,150 | 5/1984 | Kato | 358/283 |
| 4,495,522 | 1/1985 | Matsunawa et al. | 358/280 |
| 4,553,173 | 11/1985 | Kawamura | 358/283 |
| 4,700,235 | 10/1987 | Gall | 358/283 |
| 4,736,254 | 4/1988 | Kotera et al. | 358/283 |
| 4,783,837 | 11/1988 | Kawamura et al. | 382/50 |
| 4,905,294 | 2/1990 | Sugiura et al. | 382/9 |
| 4,916,545 | 4/1990 | Granger | 358/456 |
| 4,918,622 | 4/1990 | Granger et al. | 364/518 |
| 4,920,501 | 4/1990 | Sullivan et al. | 364/518 |
| 4,977,458 | 12/1990 | Granger et al. | 358/456 |

FOREIGN PATENT DOCUMENTS 0189782 10/1984 Japan .................................. 358/465

Primary Examiner—Leo H. Boudreau
Assistant Examiner—Andrew W. Johns
Attorney, Agent, or Firm—Mark Z. Dudley

[57] ABSTRACT

In the present invention each input pixel value is compared against a randomly selected threshold value to provide an output pixel having a value indicative of which of the values is greater. The threshold value is selected from one of a plurality of threshold matrices, each having a predetermined number of threshold values that are arranged in a pattern with the values for a base matrix being increased by an increment for each succeeding one of the plurality of threshold matrices. The selection of the one threshold matrix is made by means of a pseudo-random number generator.

10 Claims, 2 Drawing Sheets

METHOD FOR GENERATING HALFTONE IMAGE DATA WITH RANDOMLY SELECTED THRESHOLD ARRAY

TECHNICAL FIELD OF THE INVENTION

The present invention relates to the field of digital image processing and more particularly to a method and associated apparatus that uses multiple threshold matrices and a random number sequence to select the matrices for performing halftoning operations.

BACKGROUND OF THE INVENTION

The current practice of halftone rendering for electronic printing involves using a threshold matrix and comparing the threshold values in the matrix with the image data values. In electronic printing, particularly for multi-color printing, the threshold matrix is often rotated, or sampled in a rotated fashion, to obtain a rotated halftone screen. One reason rotated screens are used is to minimize hue shifts due to any mis-registration between separations. A side effect is the presence of rosette patterns formed by the overlapping dot structure. These patterns can be objectionable, especially in lower resolution (200 to 400 dot per inch ) printers. When using rotated screens, moiré patterns can also result as a product of interference patterns created from the screen angle and the screen ruling combinations.

In some applications, shifted screens have been used. A shifted screen is where all four separations are generated using the same screen angle (typically 45 degrees) and a small offset is applied in different directions, to each of the separations. This approach simplifies the halftone process because the threshold matrix does not have to be rotated. One desirable consequence of using a shifted-screen is that there are no rosette or moiré patterns.

The organization of the threshold values, in the matrix, may be a dither matrix, center-weighted halftone dot or any other pattern. The center-weighted dots are typically used in conventional and electronic printing.

The aforementioned techniques have a limitation in that there must be a threshold matrix for each different screen ruling and angle, or alternately a method for rotating and scaling the matrix to support various screen angles and rulings if they are desired. Also, there often is an implicit limitation to the different number of screen rulings and screen angles that can be supported due to the fact that the output frequency value from the writer divided by the desired screen ruling value is usually required to result in an integer value. Wherein the integer value would be used to define the size of the threshold matrix.

The limitation of this approach has been that the number of tone or gray levels is limited to the number of elements in the threshold matrix. For example, for a ×4 threshold matrix the halftone image will have only 16 tone levels.

A number of U.S. Patents teach the use of multiple threshold matrices, and a variety of methods to select the different matrices, at different times, to do the comparison against the input image data value. See, for example, U.S. Pat. Nos. 4,449,150, 4,495,522, 4,700,235, and 4,905,294. Several of these patents discuss the nature of the contents of the matrices, others do not. U.S. Pat. No. 4,495,522 uses the actual density value of the image to modulate the selection of the multiple threshold matrices. U.S. Pat. Nos. 4,449,150 and 4,905,294 select one of the multiple threshold matrices for each input value, based on a pseudo-random number which is supplied as a seed value by a counter (triggered by the clock signal driving the input channel). The random selection of threshold matrices in the prior art has been used primarily for purposes of moiré and noise suppression.

SUMMARY OF THE INVENTION

In the present invention there is provided a sequence of threshold matrices which make it possible to produce images with the full tone scale content of the original continuous tone image i.e. 8-bit gray scale image.

In the preferred embodiment of the invention the sequence is as follows:

1. forming an initial threshold matrix containing M×N elements wherein each element represents an element value and where M and N are the dimensions of the matrix. The matrix element values being the threshold values which are to be applied to an image and can be arranged in any manner and are distributed over the range of input tone scale values contained in the input image.

2. forming a plurality of threshold matrices, identical to the matrix formed in step 1, with the difference that the element values for each subsequent matrix are incremented from the preceding matrix. The number of the matrices being equal to the number of input tone scale values divided by the number of elements in the initial threshold matrix.

3. randomly selecting one of the plurality of formed matrices for each pixel or group of pixels in the output image.

4. determining the value for each output pixel by comparing the value of the input pixel with the value of the element of the selected threshold matrix corresponding to the output pixel.

5. forming the output image utilizing the determined output pixel values.

From the foregoing it can be seen that it is a primary object of the present invention to provide an improved method for generating halftone images with increased tone scale resolution.

It is another object of the present invention to provide an improved method with a simple hardware configuration.

These and other objects of the present invention will become more apparent when taken in conjunction with the following description and drawings wherein like numbers indicate like characters and which drawings form a part of the present specification.

DESCRIPTION OF THE PREFERRED EMBODIMENTS OF THE INVENTION

Figure 1:
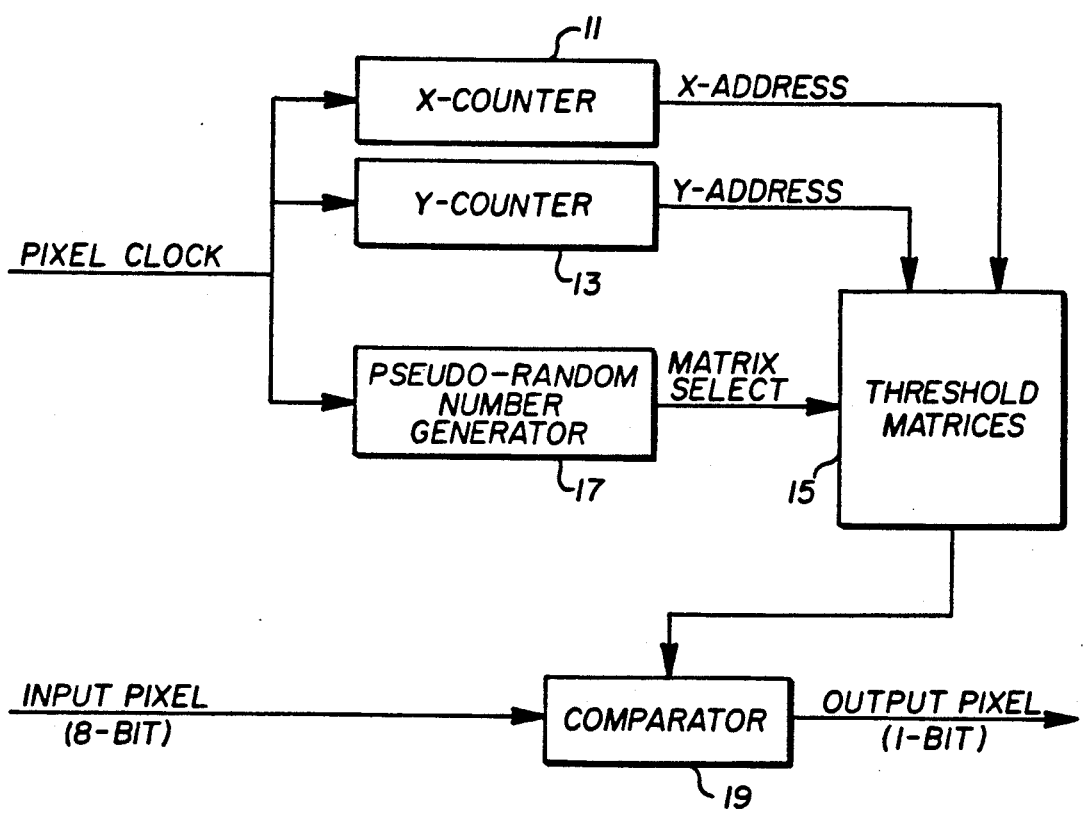
FIG. 1 is a block diagram illustrating a system arrangement that uses a random number generator for selecting one or more threshold matrices.

FIG. 1 illustrates, in block diagram form, a system 10 which may be used for implementing the present method. In operation of the system, pixels are inputted, as a multiple bit value such as an 8-bit value, to a comparator 19 along with a threshold value. These inputs are compared in value and the result of that comparison determines the value for the output pixel, as a single bit. The threshold value is derived from a threshold matrix which is selected from a plurality of matrices 15 by the output signal from a pseudo-random number generator 17. The pseudo-random number is generated for each output pixel or alternately for a group of output pixels. The X, Y coordinates of the element of the threshold matrix to be compared with the input value are determined by the X-counter 11 and the Y-counter 13 which are appropriately incremented by a Pixel Clock for each output pixel. For example the X counter is incremented for each output pixel along the scan line, and the Y counter is incremented for each scan line of the output image. When the last element of a row or column of the threshold matrix is reached the next increment will wrap around to the first element of that row or column —this process will repeat until the end of the scan line and until the last scan line of the image. The Pixel Clock signal is also used to drive the pseudo-random number generator 17. The coordinates of the input pixel within the original image are also determined from the Pixel Clock. Depending on the scaling of the image the address of the input pixel may be incremented at the same rate or at a different rate than the address of the threshold matrix.

As an example consider an image containing 256 tone levels. A 4×4 threshold matrix that can be used to halftone this image is shown in the table of FIG. 2.

This implementation would limit the output image to 16 different tone levels corresponding to the 16 different threshold values. This is stated as the following step 1:

1. forming an initial threshold matrix containing M×N elements wherein each element represents an element value and where M and N are the dimensions of the matrix. The matrix element values being the threshold values which are to be applied to an image and can be arranged in any manner and are distributed over the range of input tone scale values contained in the input image.

Figures 2, 3:
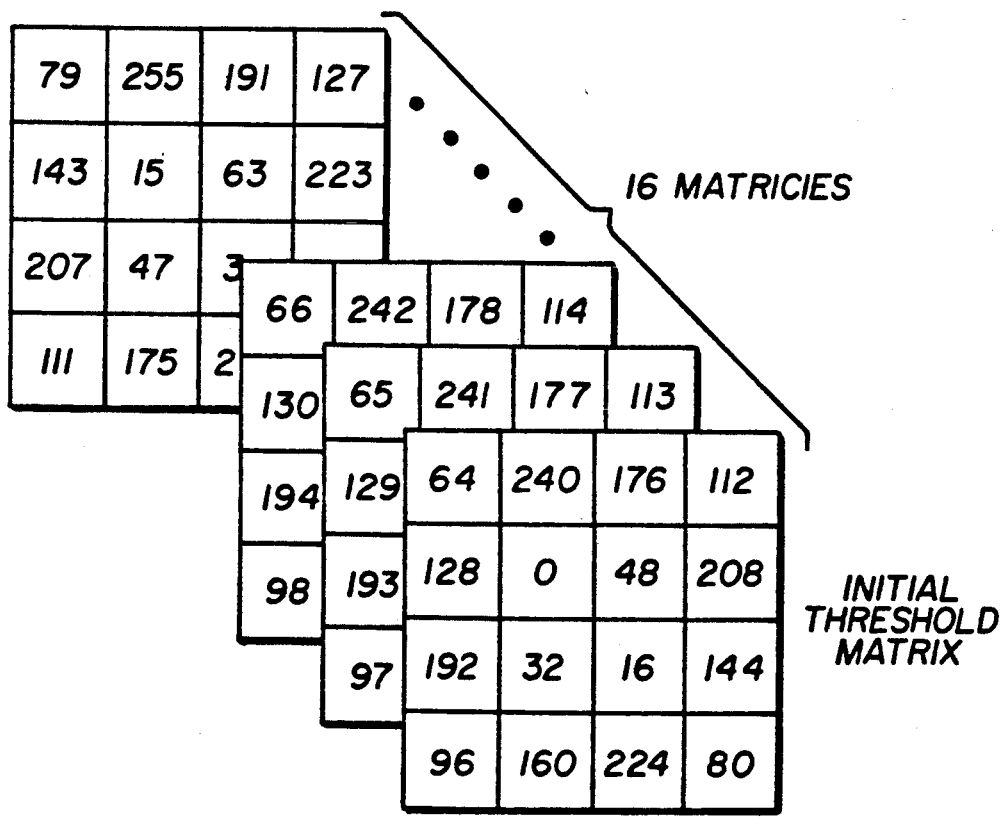
FIG. 2 illustrates a 4×4 threshold matrix.
FIG. 3 is a fictional perspective diagram illustrating an arrangement of a plurality of threshold value matrices determined in accordance with the present invention.

Referring to FIG. 3, there is illustrated a plurality of matrices (16) where the values of the elements for each subsequent matrix are incremented by one from the preceding matrix. The number of matrices is found by dividing the number of tone or gray levels in the input image (256) by the number of elements in the threshold matrix (16). This is stated as the following step 2:

2. forming a plurality of threshold matrices, identical to the matrix formed in step 1, with the difference that the element values for each subsequent matrix are incremented by one from the preceding matrix. It is understood that in the preferred embodiment of the invention that the incrementing is by one, but other increments may be selected without departing from the teachings of the present inventors. The number of the matrices being equal to the number of input tone scale values divided by the number of elements in the initial threshold matrix.

These 16 matrices are selected randomly for each output pixel by the Matrix Select signal of FIG. 1. This is stated as the following step 3:

3. randomly selecting one of the plurality of formed matrices for each pixel or group of pixels in the output image.

As previously described the X and Y coordinates of the element of the threshold matrix corresponding to the output pixel that is currently being calculated is given by the values of the X and Y Counters. The value of the threshold matrix element at this coordinate position, for the matrix selected in step 3, is compared to the value of the corresponding input pixel. If the value of the input pixel is greater than the value of the threshold the output pixel will be designated as ON. If the value of the input pixel is less than or equal to the value of the threshold the output pixel will be designated as OFF. This is stated as the following step 4:

4. determining the value for each output pixel by comparing the value of the input pixel with the value of the element of the selected threshold matrix corresponding to the output pixel.

The collection of output pixels is forwarded to a printing device such as a laser printer where the particular color tone is printed as a dot when the output pixel value indicates an ON condition. It is also possible to design the system with the opposite polarity such that an ON condition causes no printing. This is stated as the following step 5:

5. forming the output image utilizing the determined output pixel values.

For printing color images the shifted dot approach provides for a first array of dots to be printed with one tone on a particular dot center and for second and subsequent colors the dot centers for the array of dots is offset by a small amount. For two colors there are two screenings and for three colors there are three screenings etc. The aforementioned method is thus used in a repeated fashion until all of the desired colors are printed.

Although the preferred embodiment of the invention samples or selects one of the matrices for each output pixel occurrence it may also be advantageous to randomly select the matrix only on every second or third period of the output pixel occurrence. This may permit faster device operation however as the selection period decreases in frequency the advantages achieved with the present implementation begin to deteriorate.

While there has been shown what is considered to be the preferred embodiment of the invention, it will be manifest that many changes and modifications may be made therein without departing from the essential spirit of the invention. It is intended, therefore, in the annexed claims, to cover all such changes and modifications as may fall within the true scope of the invention.

We claim:

1. A method incorporating randomly selected threshold arrays for generating a halftone image from an input image comprising the steps of:
   a. forming a plurality of threshold arrays, each with a predetermined number of threshold values accessed by row and column coordinates such that the values of each of the elements for a base threshold array is incremented for each succeeding one of said plurality of threshold arrays;
   b. receiving into a electronic apparatus an input pixel value representing a pixel of the input image;
   c. electronically selecting one threshold value from a randomly selected one of the plurality of said threshold arrays;
   d. electronically comparing the input pixel value and the selected threshold value; and
   e. generating an electronic output pixel value dependent upon which of the input pixel value and the selected threshold value is greater, thereby generating a pixel of the halftone image;

wherein the step of selecting one threshold value includes a step of determining an input pixel coordinate and a matrix element coordinate corresponding to the output pixel coordinate by:

1. determining the input pixel coordinate based on the position of the input pixel within the input image;
2. determining the row and column coordiantes within the selected threshold array by sequentially stepping through the rows and columns of the threshold array, with the column coordinate being incremented by a fixed increment for each output pixel along a scan line and the row coordinate being incremented for each scan line, the row and the column coordinates returning to the first row or column when a coordinate exceeds the matrix dimension; and
3. determining the threshold value at the row and column coordiantes of the randomly selected threshold array.

2. The method according to claim 1 wherein the threshold values of the base threshold matrix are evenly distributed over the range of input tone scale values.

3. The method according to claim 1 wherein the plurality of the threshold matrices is equal to the number of tone scale values divided by the number of elements in the base threshold matrix.

4. The method according to claim 1 wherein step a further includes the step of incrementing each element by the same amount as the other elements of its corresponding matrix.

5. The method according to claim 1 wherein the element values for each subsequent threshold matrix are incremented by a fixed increment from the preceding threshold matrix.

6. A method incorporating randomly selected threshold arrays for generating a halftone image from an input image comprising the steps of:

a. forming a initial threshold array containing M×N elements wherein each element represents an element value and where M and N are the dimensions of the array, the array element values being the threshold values which are to be applied to an image and are distributed over the range of input tone scale values contained in the input image;
b. forming a plurality of threshold arrays, according to the array formed in step a, with the difference that the element values for each subsequent threshold array are incremented in value from the preceding array;
c. receiving into an electronic apparatus an input pixel value representing a pixel of the input image;
d. randomly selecting one of the plurality of formed arrays for each pixel or group of pixels in the output image;
e. determining the value of the output pixel by electronically comparing the value of the input pixel with the value of the element of the selected threshold array corresponding to the output pixel including;
  i. determining an input pixel coordinate and an array element coordinate corresponding to the output pixel coordinate by;
    1. determining the input pixel coordinate based on the position of the current input pixel within the input image;
    2. determining the row and column coordinates within the currently selected one of the said threshold arrays and columns of the threshold array with the column coordinate being incremented for each output pixel along a scan line and the row coordinate being incremented for each scan line, the row and the column coordinates returning to the first row or column when a coordinate exceeds the array dimension;
  ii. determining the value of the array element at said array element coordinate for the currently selected one of the said threshold arrays;
  iii. comparing the value of the input pixel to said value of the threshold array element and determining which is greater; and
  iv. assigning a value to said output pixel based on which value is greater; and
f. forming the output image utilizing the determined output pixel values.

7. The method according to claim 6 wherein the threshold values of the initial threshold matrix are evenly distributed over the range of input tone scale values.

8. The method according to claim 6 wherein the plurality of the threshold matrices is equal to the number of tone scale values divided by the number of elements in the threshold matrix.

9. The method according to claim 6 wherein step a further includes the step of incrementing each element by the same amount as the other elements of its corresponding matrix.

10. The method according to claim 6 wherein the element values for each subsequent threshold matrix are incremented by a fixed increment from the preceding threshold matrix.

* * * * *